UNITED STATES PATENT OFFICE.

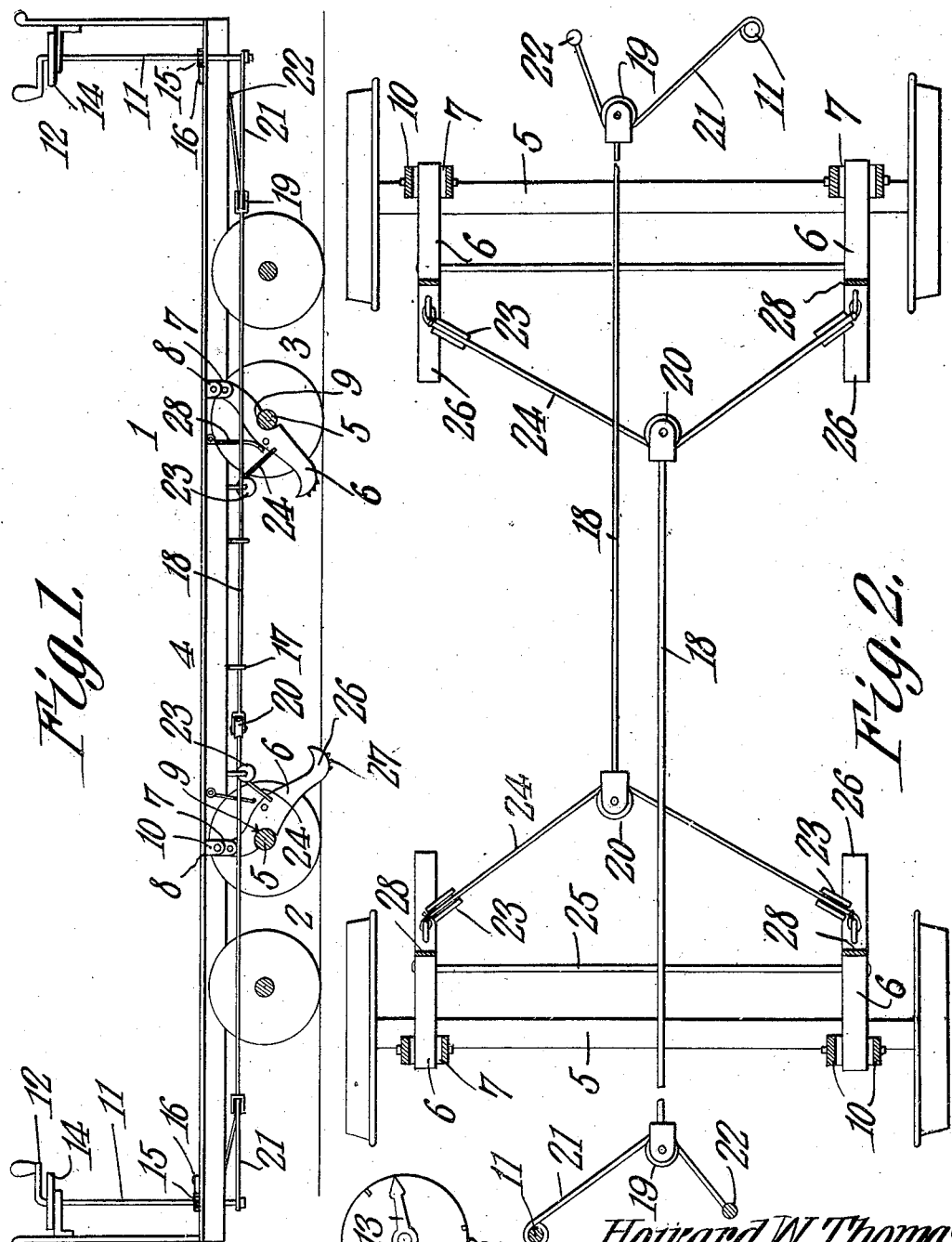

HOWARD W. THOMAS, OF CHARLEROI, PENNSYLVANIA.

CAR-BRAKE.

No. 862,215.  Specification of Letters Patent.  Patented Aug. 6, 1907.

Application filed March 9, 1907. Serial No. 361,517.

*To all whom it may concern:*

Be it known that I, HOWARD W. THOMAS, a citizen of the United States, residing at Charleroi, in the county of Washington and State of Pennsylvania, have invented a new and useful Car-Brake, of which the following is a specification.

This invention relates to car brakes, more particularly to the type known as the emergency brakes which are applied more generally to cars having self contained motors and used especially in urban, suburban and interurban traffic. Cars of this type are almost exclusively driven by electricity acting as a motive power and travel singly or with one and sometimes two trailers. Cars of this type, especially in suburban and interurban traffic travel at very high speeds at times and the hand brake, which the majority of them use, and even the air brake are not sufficient to check the speed of the car under certain circumstances of impending danger.

To provide for such emergencies as above described, and others, emergency brakes have been adopted, one form of which is to lower a shoe into contact with the ground and cause an almost instantaneous stopping of the car; and it is to this class that the invention hereinafter described pertains.

In the accompanying drawings: Figure 1 is a longitudinal sectional view through the floor of a car and running gear showing the improved brake applied thereto, the shoe being raised at one end of the car and lowered at the other end. Fig. 2 is a plan view of the running gear and brake mechanism, the car body being removed. Fig. 3 is a detail view.

Similar numerals of reference indicate corresponding parts throughout the several figures of the drawings.

A car 1 mounted at one end on a car truck 2 and at the other end on a truck 3 is represented in the drawings in a skeleton form, only so much of a car body and running gear being illustrated as is necessary to show the invention. Pivoted to the under side of the car body 4 or truck frame and above the axle 5 of each inner wheel of the trucks 2 and 3 is a brake shoe or dog 6 hung by links 7 in a fixed bearing 8. As the brake and brake mechanism at each end of the car are alike, a description of one will suffice for both. The under or forward side of the brake dog or shoe 6 is provided with an approximately semi-circular seat 9, adapted to fit over the axle 5 and in an emergency rock on said axle. At its upper end the brake dogs 6 are hung between the links 7 which in turn are pivoted to the depending ears 10 of the bearing 8; as thus constructed, the brake shoe or dog 6 when resting against the axle 5, may be given a slight rocking movement because of the loose connection of its upper end with the fixed bearing 8.

At each end of the car platform is journaled a brake staff 11 having a suitable operating handle 12 and an indicating hand 13 fixed to the brake staff 11 and adapted to rotate over the face of a dial 14, fixed in a stationary manner to the car body. The brake staff 11 extends below the car body in the usual manner and carries a ratchet 15 and a foot operated pawl 16, such as are in common use on cars of the present day.

Supported in hangers 17 beneath the car body 4, is a rod 18 on each end of which is pivoted a pulley, the one nearest the brake staff being numbered 19 while that of the opposite end or near the brake shoe or dog is numbered 20. Around the lower end of the brake staff 11 is wrapped a rope or chain 21, one end of which is attached to the brake staff from whence it passes around the pulley 19 on the rod 18 and thence to a fastening 22, secured to the under side of the car floor. It will be readily understood that on turning the handle 12 the rope or chain 21 will be wound on the lower end of the brake staff and because the opposite end of the rope or chain is fixed, the rod 18 will be caused to slide longitudinally in its bearings 17. Suspended from the car body or the frame of the truck and above the brake shoe or dog 6, is a pulley 23 over which a rope or chain 24, after passing around the pulley 20 on the rod 18, extends down to and is attached by any suitable means to the brake shoes or dogs 6 on each side of the car. It may be well to mention at this point that there are four brake shoes or dogs 6 on each car; two at each end and near the sides of the car, but a short distance inside of the wheels carried by the axle 5. The brake shoes or dogs 6 extend toward each other at each end of the car so that the brakes at one end of the car will be operated when the car is moving in one direction and vice versa. The brake dogs or shoes at each end of the car are joined by a cross rod 25 so that they will move in unison. The lower ends 26 of the brake dogs or shoes which come in contact with the ground are provided with teeth 27, extending crosswise on their under side to enable the dogs or shoes 6 to take a firm hold when lowered to the ground.

Because of the great strain to which the brake shoes or dogs are subjected, they are made quite strong and heavy and are arranged as above described to engage, when in operative position, with the axles 5, which will take practically the entire strain as the suspending bearings 8 are made quite light as compared with the connections between the brake shoes and the axles. A spring 28 is attached to the car frame above each brake dog which in combination with the weight of said dog will cause it to fall quickly and strike the ground as soon as it has been disengaged.

The longitudinal movement of the rod 18 as herein above described will cause the pulley 20 to move forward carrying with it the rope or chain 24, the ends of which, it is to be remembered, are attached to brake dogs or shoes 6, the movement raising the brake dogs from contact with the ground in which position they are retained by throwing the foot pawl 16 into engagement with the ratchet 15 on the brake staff 11.

During ordinary traffic the brake shoes or dogs 6 will be raised as shown at the right in Fig. 1, the springs 28 placed under tension and the pawl 16 holding the brake shaft from rotating through its connection to the ratchet wheel 15. Assuming that the car is traveling in the direction indicated by the arrow, should the motorman observe some cause for accident which requires a very quick or emergency stop, he disengages the foot pawl 16 and allows the brake staff to rotate and loosen the rope or chain 21. The brake shoes 6 by their own weight, and because the tension of the springs 28 has been relieved, will immediately drop to the ground inside of the rails on which the wheels travel; the brakes falling on smooth or rough pavement, track ballast or cross ties, the nature of which is determined by the country through which the car is passing, that is to say, whether it is urban, suburban or inter-urban. When the brakes fall to the ground, the notches 9 therein engage the axle 5 and take the strain caused by the shoes engaging with the pavement, ground or cross ties. The degree to which the brake shoes are lowered is indicated on the dial 14 by means of the pointer 13; the operator of the brake handle, if he be experienced in running cars, will use his judgment as to how far the brake shoes must be lowered, the pointer on the brake staff and the points on the dial will indicate when to stop the rotation of the brake staff.

Having thus described the invention what is claimed is:—

1. In an emergency brake for cars, the combination with a pair of brake dogs or shoes pivoted at one end of said car, a sliding brake rod beneath the said car and extending longitudinally thereunder, a pulley on each end of said brake rod, a flexible connection attached to each brake dog or shoe and passing around one of said pulleys, and a flexible connection extending from the pulley at the opposite end of the brake rod and having one end connected to a brake staff and the other end fixedly attached to the car.

2. In an emergency brake for cars, the combination with one of the axles, of a pair of brake dogs flexibly pivoted to the car above the axle and sufficiently long to extend to the ground, each brake shoe having a seat for engaging said axle, a sliding brake rod longitudinally disposed beneath the car and having a pulley on each end, a flexible connection extending from one of said pulleys to each brake shoe or dog, a flexible connection passing around the second pulley and fixedly connected to the car, and a brake staff to which the other end of said flexible connection is secured.

3. In an emergency brake for cars, the combination with one of its axles, of a brake dog or shoe adapted to bear on the ground at one end and having means for engaging said axle when on the ground, a flexible joint between the upper end of said brake dog or shoe and the car to permit said dog or shoe to seat itself firmly against the axle when its lower end falls to the ground, and means for raising said brake dog or shoe from the ground and the axle.

4. In combination with a car, of an emergency brake therefor comprising a pair of brake dogs or shoes flexibly pivoted to the car at each end above an axle and capable of extending to the ground, a seat being formed in each brake dog to coöperate with the adjacent axle, a fixed connection between the dogs at each end of the car, a pair of sliding brake rods beneath said car and extending longitudinally thereunder, a pulley on each end of each of said brake rods, a flexible connection attached to each pair of brake dogs or shoes, one of said pulleys on each rod attached to the flexible connections, a flexible connection passing around the other pulley on each rod at the opposite end of the car, one end of each of said flexible connections being fixedly attached to the car, and a brake staff at each end of the car to which the opposite ends of each of the latter flexible connections are attached.

In testimony that I claim the foregoing as my own, I have hereto affixed my signature in the presence of two witnesses.

HOWARD W. THOMAS.

Witnesses:
WILLIAM F. SMITH,
S. E. WILSON.